March 22, 1932. G. BRÜCKNER 1,850,126
AUTOMATIC WELDING MACHINE
Filed Sept. 5, 1930
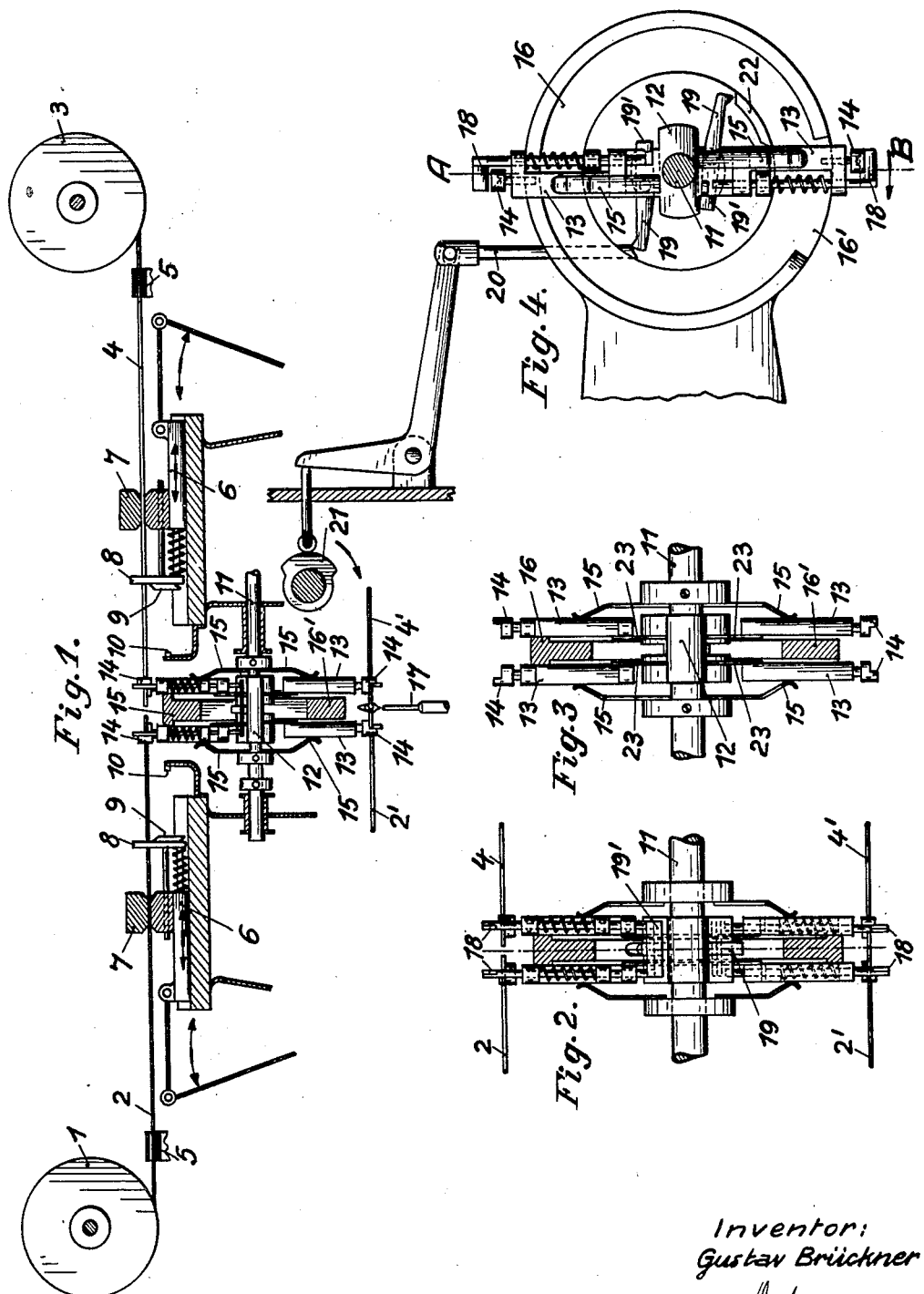
Inventor:
Gustav Brückner
by
Atty.

Patented Mar. 22, 1932

1,850,126

UNITED STATES PATENT OFFICE

GUSTAV BRÜCKNER, OF NEUSES, NEAR COBURG, GERMANY

AUTOMATIC WELDING MACHINE

Application filed September 5, 1930, Serial No. 479,886, and in Germany June 5, 1930.

This invention relates to automatic welding machines, and more particularly to machines of this kind which serve for making leading-in wires or electrodes for electrical incandescent lamps and similar devices or apparatus. Leading-in wires or electrodes are generally made by successively introducing ends of a pair of supporting wires piece by piece into a welding machine, welding said ends together after said ends have been brought into contact with each other and cutting the so completed electrode off said supply wires. According to another known process a wire of a material different from said supply wires had been welded as an intermediary piece on to the ends of the supply wires.

In all processes of making electrodes the entire operation of welding, therefore, has to be performed at the place where the ends of the supply wires are brought into contact with each other and in consequence thereof the operation of welding and cutting-off the completed electrodes from supply wires or vice versa, cannot be performed before a proper forward feeding motion has been given to both wires.

Owing to the forward feeding motion which has to be given to the supply wires, in every case that amount of time will be required which is necessary to perform said forward feeding motion of the electrode supply wires and, in addition, the subsequent process of welding.

By my present invention the working capacity of the electrode welding machine may be considerably increased by providing in the first place an automatically actuated gripping device for the electrode supply wires, said gripping device being adapted to receive the ends of said wires from a feeding device and to convey said ends of the electrode supply wires to a point at some distance from said feeding device at which point now the automatic operation of welding may be carried out. By so arranging the feeding and the gripping device for the electrode supply wires it will be possible to introduce the electrode supply wire into a subsequent gripping device as early as during an operation of welding and to keep said electrode supply wire gripped by the gripping device until the operation of welding has been completed. According to my invention, therefore, the supply of electrode wire takes place at any time and simultaneously with an operation of welding. This mode of operating an electrode welding machine will considerably shorten the time required for making the individual electrodes and in consequence thereof, the working capacity of the welding machine will be increased accordingly.

In the drawings I have shown an example of construction of my new automatic welding machine for electrode wires, Fig. 1 being a diagrammatic longitudinal view of a complete welding machine constructed according to my invention, Figs. 2 and 4 are detail views, partly in section, showing the novel gripping device which serves for gripping the electrode supply wire before being introduced into the machine as well as the novel feeding device for said electrode supply wire, and Fig. 3 is a front view showing the mode of fastening the grippers of the gripping device with omission of the pressure fingers used in connection therewith.

Referring more particularly to the drawings, the automatic electrode welding machine which forms part of my invention is equipped, as shown in Fig. 1, with the usual pair of wire supply or feeding rollers 1 and 3 from which the wires 2 and 4 are drawn-off in opposite directions and at definite intervals of time and carried through guide-members 5 as well as through the jaws 7, the ends of said wires coming thus near to each other at the central part of the machine. The jaws 7 are automatically opened and closed in periodic succession and, in addition, each of said jaws is mounted movably in longitudinal direction of the machine and in direction of the supply of wire thereto upon a slide 6. Associated with either slide 6 is a further wire-guide 8 which is mounted resiliently movable in longitudinal direction of the machine, that is in the direction of the supply of wire, and is equipped with a knife or cutter 9. A stop 10 at the end of the track of either slide 6 serves for limiting motion of the wire-guides 8, while the jaws 7 are still further moving forward, thus carrying a piece of electrode wire positioned between said wire-guides 8 and the jaws 7 beyond said wire-guide and inserting said piece of electrode wire at its forward end into the gripper heads 14 which form part of the gripping device for the electrode supply wire. The gripping device for the electrode supply wire operates by means of a pressure finger 18 which serves to keep the end of the electrode wire fixed during the now commencing backward sliding motion of the jaws 7 which had been opened in the meanwhile.

Fig. 1 shows my new automatic welding machine for electrode wires in condition in which the slides 6 carrying the jaws 7 have come into their rearmost position in which position said jaws 7 are again in condition of closing, thus to keep the two supply wires fixed while the knife or cutter 9 in front of each of the wire-guides 8 will just be in condition ready to cut the wire. The knife 9 is operated by an actuating device which is not shown herein, in a manner to cut-off at a time a piece of wire of proper length from the supply wire. The gripping device for the electrode supply wire which forms an important part of my new automatic welding machine is positioned intermediate the two wire supply devices which serve for continuously supplying wire to the machine and is equipped, for instance, with periodically rotating gripper arms. The gripping device, however, may also be constructed to operate along a straight line or in the manner of an endless chain. The gripping device, therefore, will be the first place serve the purpose of continuously feeding wire to the machine at a certain point thereof and in the second place, to facilitate simultaneously with proper feeding, the subsequent process of welding which is performed at a point distant from said former point. In the construction represented in Fig. 3 of the drawings, the gripping device consists of two pairs of gripper arms 13 mounted movably with respect to each other on opposite sides of a hub 12, resilient tongues 23 being associated with the gripping device. The hub 12 is fixedly mounted upon the shaft 11 which serves for actuating the gripping device. Each of said gripper arms 13 is equipped with a clamping head 14, preferably of the form of a screw permitting longitudinal displacement of said clamping heads 14 with respect to said gripper arms 13. The gripper arms 13 are being pressed in inward direction against a fixed angular guide member 16 positioned between the gripper arms 13 by means of the laterally provided pressure springs 15. The angular member 16 will thus serve as a spacing member and at the same time as a sliding guide for the gripper arms 13. At its under portion the angular guide member 16, as shown at 16' in Fig. 4 is narrowed by a lateral recess, permitting at this place of said angular guide member the arms 13 of the gripping device to be pressed by action of the springs 15 closer towards each other, therewith bringing the ends of the supply wires into proper contact with each other, said ends of the supply wires being kept in position by the jaws 7, whenever the operation of welding is performed.

The electrode supply wire is constantly and uniformly supplied to the clamping heads 14 at a time positioned at the uppermost point A of the gripping device, while the operation of welding is being performed at the undermost point B of the gripping device at which point there is provided a welding burner 17, as shown in Fig. 1. Alternate gripping and releasing of the pieces of electrode wire introduced into the clamping heads 14 which form part of the gripper arms 13 and the gripping device as a whole is effected by means of pressure fingers 18 which are mounted resiliently on the gripper arms 13 to exert a proper pressure upon the clamping heads 14. The pressure fingers 18 are operated by means of levers 19 mounted rotatably within a recessed or cut-away portion of the hub 12 and provided with a transverse yoke 19' which serves for commonly controlling the two actuating rods for said pressure fingers 18 on two juxtaposed gripper arms 13.

The free ends of both of said actuating levers 19 project into the interior of the recess on the angular guide member 16, a release cam 22 being likewise positioned within said recess. The lever associated with the gripper arm which is at a time in its undermost position rides upon said cam 22, said lever thus being moved upward and causing likewise upward motion of the actuating rods for the pressure fingers 18, therewith lifting the latter out of engagement with the clamping heads 14 and releasing the electrode wire after having passed the process of welding. In this manner the completed electrodes will be discharged from the machine during further rotation of the arms 13. The electrode wire after completed operation of welding may also be discharged from the machine, for instance, by means of an apron, the gripper arms 13 passing through slots provided in said apron, so that motion of said arms will cause the electrodes after completion of the operation of welding to be stripped-off said arms by said apron and fall out of the machine by sliding along the outer surface of said apron. The gripper arms which are shown in Fig. 4 at the uppermost portion of the gripping device will now engage with their ends 19 from underneath with a pressure rod 20 guided within the annular guide member 16 and adapted to be actuated by way of suitable intermediary members from a cam 21. More particularly, actuation of the pressure rod 20 will cause downward swinging of the lever 19, thereby lifting the pressure finger 18 out of engagement with the clamping heads 14, thus rendering the latter again ready for reception of the electrode supply wire. The wire supply device forming part of my new welding machine will thus in the upper position A of the gripper arms 13 be in condition of supplying wire to the clamping head 14 the pressure fingers 18 being now actuated to firmly keep said wire in position within said clamping head. Now the wire supply device is given a backward motion and subsequent thereto a proper piece of wire which had been introduced into the clamping heads will be cut-off the supply wire. Subsequent to this, the gripping device will again commence to rotate and continue its rotation through an angle of 180°, the electrode wire now arriving at the position B in which position the operation of welding is performed, the other gripper arms of the gripping device now moving upward, being thus ready for the reception of a further piece of electrode wire. The wire supply device is periodically fed forward through an angle of 180°, this forward feed of the wire supply device taking place entirely automatically, for instance, with the aid of a Maltese cross device.

Instead of arranging the gripper arms which form part of the gripping device in longitudinal and axial positions with respect to each other, the gripping device may also be equipped with further gripper arms positioned perpendicularly to said former arms, thus having four pairs of gripper arms. Evidently, the supply of electrode wire as well as the operation of welding in this case will be performed at each rotation of said supply device through an angle of 90° instead of 180° as in the construction of the gripping device with two pairs of gripper arms. By arranging four pairs of gripper arms, the working capacity of the automatic electrode welding machine will be doubled as compared with a construction having only two pairs of gripper arms. Instead of the springs 23, of course, also another movable connecting member may be used for the gripper arms, for instance, a hinge or the like. Furthermore, the construction of the machine described hereinabove and shown in the drawings may be varied in many respects without departing from the principles of my invention or sacrificing any advantages thereof.

As far as my invention is concerned it is also immaterial whether the two pieces of wire as assumed in the hereinabove described construction of the electrode welding machine are welded immediately onto each other, that is without interposing any special piece of wire therebetween, or whether an intermediate piece of wire is welded-in between the ends of the supply wire. This intermediate piece of wire may be automatically supplied to its proper position between the ends of the supply wires in the undermost position B of the gripper arms in which position the welding operation is performed.

I claim:

1. An automatic welding machine for making electrodes, especially electrodes for electric incandescent lamps and the like, said machine comprising mechanism for supplying a pair of electrode wires to said machine, a gripping device adapted to grip the ends of said wires, a cutter adapted to cut-off said ends, welding means co-operative with said gripping device, and automatic actuating mechanism for periodically operating said supply mechanism, said gripping device and said cutter in proper succession to carry pieces of wire cut-off from said wires in front of said welding means.

2. An automatic welding machine for making electrode wires as specified by claim 1, having a gripping device which is provided with rotatably mounted gripper arms arranged in pairs opposite to each other, a fixed member associated with said gripper arms, and means for adjustably pressing said gripper arms against said guide member, said guide member being positioned intermediate said arms and permitting opposite motion thereof in position of said gripper arms in front of the welding means.

3. An automatic welding machine as specified by claim 1, having a gripping device which is composed of gripper arms, a hub adapted to resiliently support said gripper arms permitting relative adjustment of the latter actuating levers associated with said hub, pressure and gripping members associated with said gripper arm, the automatic means comprising a cam, and an adjusting rod associated with said cam and periodically close and open said gripping members.

4. An automatic welding machine as specified by claim 1, in which the automatic actuating mechanism comprises a cam, an actuating rod associated therewith, and a fixedly mounted annular guide member positioned intermediate the gripper arms and adapted to form a bearing member for said cam and said actuating rod.

5. An automatic welding machine as specified by claim 1, in which the gripping device comprises at least one pair of gripper arms positioned adjacent to each other and mounted rotatably on a hub to permit periodical gripping and welding operations in subsequent annular positions of said gripper arms.

6. An automatic welding machine as specified by claim 1, in which the gripping device comprises a hub, gripper arms mounted resiliently upon said hub, pressure means including gripping fingers associated with said gripper arms, actuating levers for actuating said gripping fingers upon rotation of said hub and said gripper arms, a cam and actuating rod for alternately moving said gripping fingers into and out of engagement with respect to pieces of the electrode wires.

In testimony whereof I affix my signature.

GUSTAV BRÜCKNER.